Figure 1:
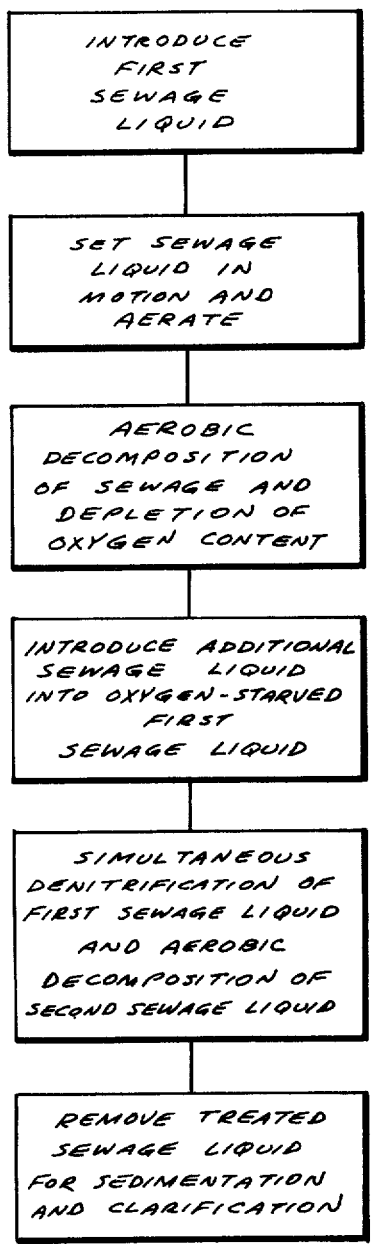

United States Patent [19]
Rongved

[11] 3,900,394
[45] Aug. 19, 1975

[54] PROCESS FOR TOTAL SEWAGE TREATMENT
[75] Inventor: Paul I. Rongved, New York, N.Y.
[73] Assignee: Activox, Inc., New York, N.Y.
[22] Filed: May 16, 1974
[21] Appl. No.: 470,392

Related U.S. Application Data
[62] Division of Ser. No. 260,295, June 6, 1972, abandoned.

[52] U.S. Cl. ............................ 210/7; 210/14; 210/16
[51] Int. Cl. ........................................... C02c 1/06
[58] Field of Search ............. 210/2, 3, 4, 6, 7-9, 210/14, 15, 16

[56] References Cited
UNITED STATES PATENTS
3,485,750  12/1969  Albertson ......................... 210/14
3,579,439  5/1971   Meiring et al. ................... 210/5
3,654,147  4/1972   Levin et al. ...................... 210/6

OTHER PUBLICATIONS
Johnson, W. K. et al., "Nitrogen Removal by Nitrification and Denitrification," Journal W.P.C.F., Vol. 36, August, 1964, pp. 1033–1035.

Pasveer, A., "Waste Treatment," Pergamon Press, N.Y., 1960, pp. 143–155.

Primary Examiner—Charles N. Hart
Assistant Examiner—Benoit Castel
Attorney, Agent, or Firm—Samson B. Leavitt

[57] ABSTRACT

An improved process for the purification and denitrification of sewage which comprises setting the sewage liquid in motion, aerating the sewage liquid to effect the aerobic decomposition thereof, allowing said aerobic decomposition to continue until substantially the entire oxygen content of said aerated sewage liquid has been depleted, adding additional untreated sewage liquid thereto for the purpose of denitrifying the aerated sewage liquid, and withdrawing said aerated, denitrified sewage liquid for clarification and/or sedimentation and/or recycle; and an apparatus directed thereto which comprises an aeration reservoir fitted with inlet means, agitating means and outlet means, said inlet means being positioned in said reservoir to allow for maximum aerobic decomposition and denitrification.

2 Claims, 4 Drawing Figures

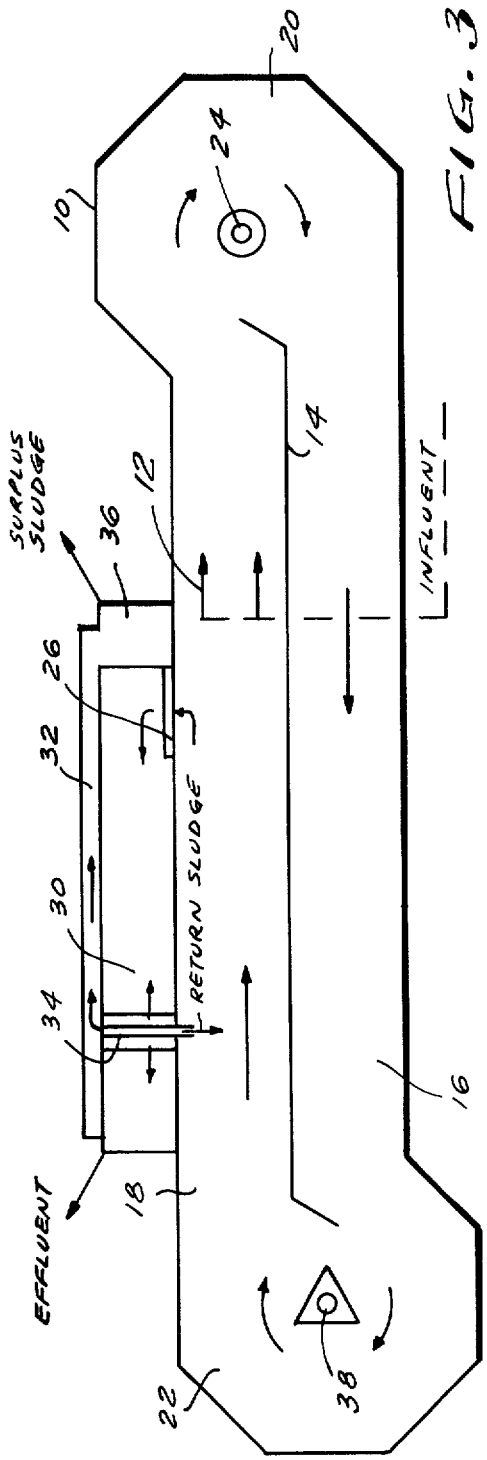
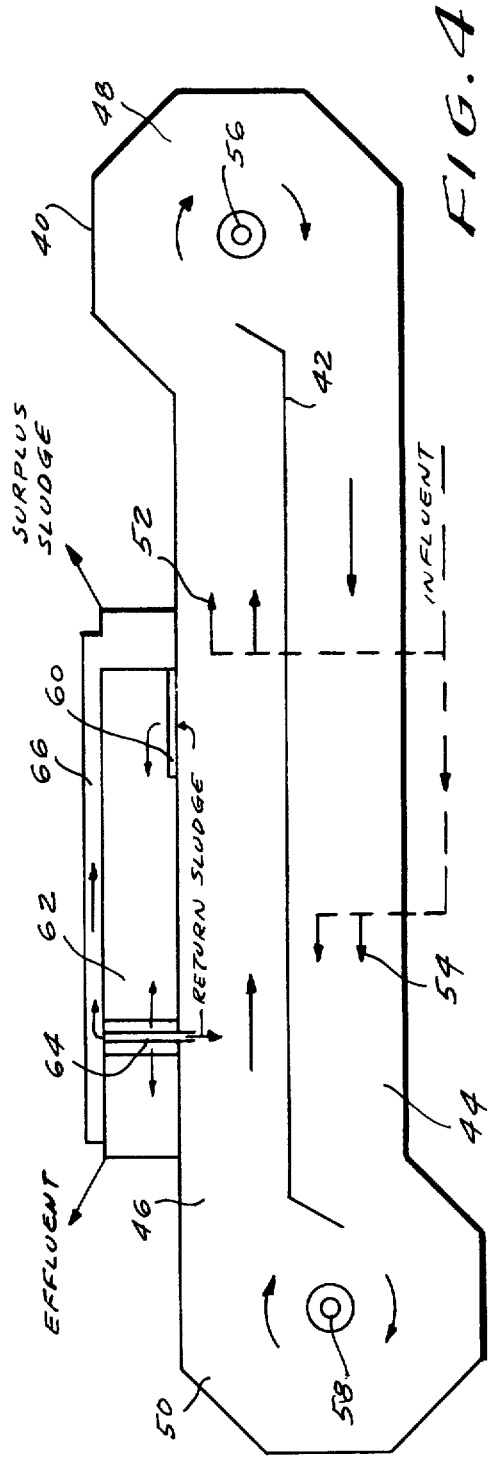

PROCESS FOR TOTAL SEWAGE TREATMENT

This is a division of application Ser. No. 260,295, filed June 6, 1972, now abandoned.

This invention relates to a process and apparatus for treating sewage whereby the organic components of the sewage are aerobically decomposed and the nitrates formed as a result of such aerobic decomposition are broken down into their basic elements.

The activated sludge process deals with the removal of the fine material, colloidal material and organic compounds which remain in sewage after it has had the large and heavy substances removed by screening and/or gravitational settling. These residual materials generally comprise carbohydrates, cellulose and its derivatives, proteins, amines, ammonia, mineral substances and bacterial life and live protozoa which feed on such matter.

Such sewage is subjected to oxygenation by agitating the same in the presence of oxygen or air which causes a chemical and/or biological reaction to take place. As a result of the reaction, the sewage particles form a sludge floc which readily settles and which also causes bacterial life and other small living organisms to grow and reproduce. The sludge floc thus becomes active in absorbing and oxidizing the organic matter contained in the sewage so that the organic matter will be decomposed into carbon dioxide, soluble products and products easily precipitated. Likewise, if the process is conducted for a sufficiently extended period, the ammonia content of the sewage will be decomposed into nitrates and hydrogen ion. Furthermore, as the floc settles, it takes with it nearly all of the suspended solids in the sewage and much of the solids in the colloidal state. This "activated sludge" is maintained by returning to the sewage a portion of the recovered sludge. This separation and recirculation of the activated sludge to fresh raw sewage for further aeration results in the continuous purification of the water of the sewage, so that at least 90% of the biochemical oxygen demand (B.O.D.) of the organic matter present in the raw sewage water is removed. The water remaining after settling out of the activated sewage floc may then be discharged into adjacent rivers, streams and canals. A complete description of such an activated sludge process and an apparatus for conducting the process may be found in U.S. Pat. No. 2,684,941, issued July 27, 1954.

It should be noted, however, that the effluent of the purified sewage still contains soluble nitrogen compounds (from decomposition of ammonia), phosphates and the like. The discharge of these materials into lakes and streams is undesirable inasmuch as they promote the growth of algae and other water flora which, in turn, deplete the oxygen content of the stream and thereby pollute the receiving waters.

Such denitrification is generally not part of the prior art activated sludge processes. However, where attempts have been made to remove such potential pollutants, they have generally relied on the use of external denitrification reservoirs in which the activated sludge is kept in an oxygen-deficient atmosphere so that the bacteria present are able to decompose the nitrates and thereby consume the released oxygen thereof. Such techniques, however, have been space- and time-consuming, expensive and relatively inefficient in that only 50–60% of the nitrate content formed in the activated sludge process is removed.

It is therefore the prime object of this invention to provide an improved sewage purification process.

It is a further object to provide a unique denitrification technique.

It is still a further object to utilize said denitrification technique in conjunction with the activated sludge process for sewage purification.

It is another object to conduct aerobic decomposition and denitrification of sewage liquid in a combined, continued process.

It is still another object to substantially eliminate the pollutant effect of activated sludge effluent.

In accordance with these objects, I have discovered a highly efficient purification and denitrification process which substantially eliminates the pollutant effect of the effluent waters resulting from the process and which also substantially overcomes the difficulties inherent in prior art denitrification techniques. Thus, the denitrification step of the instant invention comprises adding fresh raw sewage to sewage liquid in the reservoir which has undergone aerobic decomposition and is substantially devoid of oxygen. The bacteria in the activated sludge-containing liquid thus have additional organic matter with which to react but are starved for oxygen. In order to satisfy their oxygen requirement, they act upon the nitrate compounds dissolved in the liquid and consume the oxygen resulting from the decomposition thereof. Continuous operation of the process and removal of the solid matter in said liquid provides an effluent which generally contains no more than about 10% of the said nitrate compounds produced by said aerobic decomposition of ammonia in the liquid.

The apparatus provided for the operation of the process comprises an aeration reservoir fitted with inlet means, at least one agitating means, and outlet means. In constructing the apparatus, it is essential that the inlet means be positioned sufficiently far from the agitating means so as to allow sufficient time for the aerobic decomposition of the sewage liquid and for the substantial depletion of the oxygen content thereof. Likewise, the inlet means should be positioned sufficiently far from the point of next aeration to allow for significant denitrification of the sewage liquid before renewed aeration of that liquid.

Figure 2:
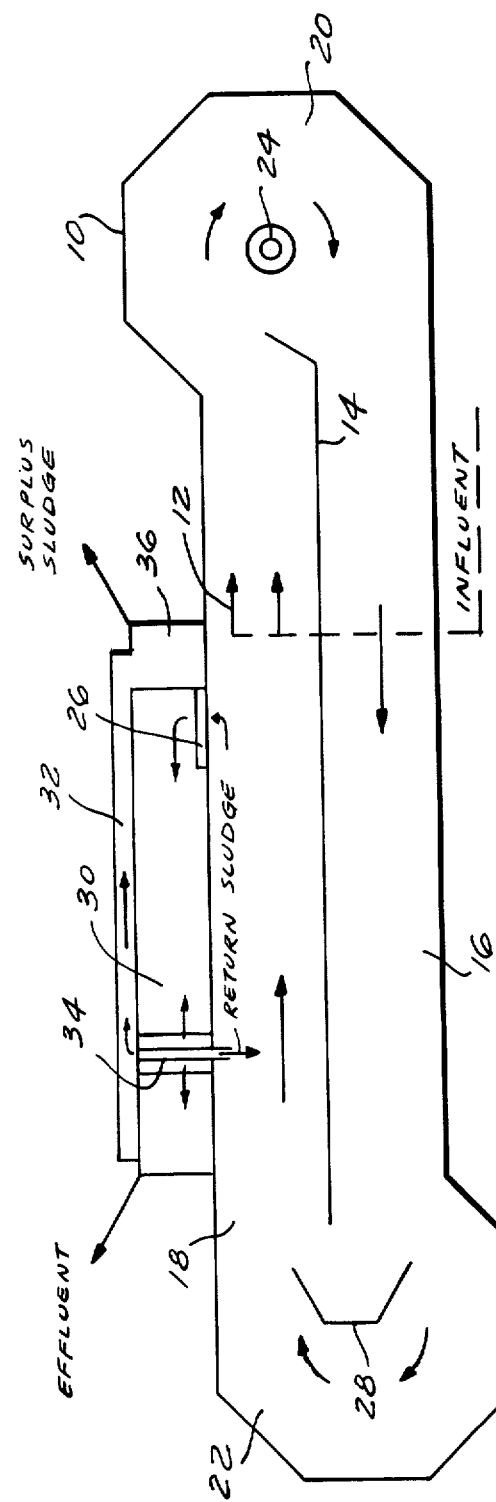

To the accomplishment of the above, the present invention relates to a process and apparatus for sewage treatment as defined in the appended claims and as described in this specification, taken together with the accompanying drawings, in which:

FIG. 1 is a flow diagram depicting the path taken and the process steps encountered by the sewage in accordance with this invention; and, FIG. 2, FIG. 3 and FIG. 4 are schematic plan views of typical apparatuses of this invention depicting their several component parts and the relationship of these parts Referring now to FIG. 2, the typical apparatus of this invention depicted therein comprises an aeration reservoir 10 fitted with inlet means 12. The aeration reservoir 10 may be divided by means of partition 14 into two sections 16, 18 (shown as equal but not necessarily so) which are in communication in areas 20, 22. Agitating means 24 is mounted in said reservoir 10, generally in communication area 20. The agitating means 24 serves to aerate the sewage liquid by beating the air or oxygen above the surface of the liquid into the liquid while also keeping the sewage liquid in motion in reservoir 10 without substantial settling of the sludge therein. Such agitating means are well known to those skilled in the art and the practitioner is free to select the agitating means, whether it be horizontally or vertically disposed, which is best for his particular system.

The speed of the agitating means as well as its depth in the sewage liquid may also be varied in order to achieve optimum aeration conditions. Furthermore, a vertically disposed agitating means may be alternately converted into a mixer-propulsion means merely by reducing the speed of rotation and lowering the insertion depth of the agitating propeller.

The location of inlet means 12 in reservoir 10 is dependent primarily on the relative distances between inlet means 12 and agitating means 24. Thus, it is to be noted that the distance between agitating means 24 and inlet means 12 in the direction of flow, should be sufficient to allow for substantial aerobic decomposition of the sewage liquid as well as to enable the aerobic decomposition to continue to the point where the oxygen content of said sewage liquid is substantially depleted. Likewise, the distance between the inlet means 12 and agitating means 24, the section of reservoir 10 in which the denitrification process occurs, should be sufficient to permit a substantial amount of denitrification to occur prior to further aeration. For purposes of this invention, it has been determined that this distance between inlet means 12 and agitating means 24 should be at least 10% of the total distance traveled by the sewage liquid in making one complete cycle between consecutive aerations at agitating means 24, i.e., at least 10% of the sum total of (a) the distance between agitating means 24 and inlet means 12, and (b) the distance between inlet means 12 and agitating means 24; both being determined in the direction of flow of the liquid. While the positioning of inlet means 12 relative to outlet means 26 is of minimal consequence, it is preferred that the inlet means 12 be located at a position other then immediately prior to or adjacent to outlet means 26 in order to avoid short circuiting the process as a result of the discharge of untreated sewage liquid. Virtually any other position in reservoir 10 is acceptable provided that it comply with the prescribed distance requirements between inlet means 12 and agitating means 24.

Communication area 22 may, if desired, be fitted with a flow regulator baffle 28 to control the direction and uniformity of flow.

Outlet means 26 leads into sedimentation system 30. Sedimentation system 30 may contain primary and secondary sedimentation tanks, clarifiers and/or surplus sludge thickeners and the like. The activated sludge from the sewage is settled by gravity in the sedimentation system 30, while the clear purified water overflows the outlet edges of the system 30 and may be directly discharged into an adjacent stream or may be further chemically treated, clarified and sterilized in a secondary sedimentation tank (not shown). The sludge in suspension which settles to the bottom of system 30 may be totally withdrawn or all or a major part thereof recycled via line 34 and returned to reservoir 10 for mixing with the sewage liquid contained therein. Surplus sludge flows via trench 32 to surplus sludge thickener 36 and is thereafter removed.

Relating the process steps noted in FIG. 1 to the apparatus depicted in FIG. 2, it is seen that raw untreated sewage liquid, i.e., the mixture of sewage and water which remains after removal of the heavier materials in the sewage, is passed into the aeration reservoir 10 via inlet means 12. The sewage liquid is set in horizontal motion in the reservoir and subsequently brought into contact with the agitating means 24 whereby it is aerated and continued in horizontal motion in the reservoir. The aerobic decomposition which occurs thereafter encompasses the decomposition of the organic compounds in said sewage into soluble and precipitatable solids, water and carbon dioxide gas. This aspect of the process serves to provide a primary energy source for additional bacteria growth. A further bacterial process leads to the conversion of the ammonia content into nitrates which remain in the liquid as dissolved nitrogen compounds. It is to be noted that the bacteria for the above process get attached to the sludge floc which is formed from substantially all of the solids suspended in the liquid. In sedimentation system 30, the flocs settle as sludge which, upon being pumped back into reservoir 10, provide bacteria with an average age of 30 to 40 days.

The aerobic decomposition is allowed to continue to the point where the oxygen content in said aerated sewage liquid is substantially depleted. At this point 12, fresh untreated sewage liquid is introduced into said sewage liquid in motion in the reservoir in order to initiate the denitrification technique. Thus, the conditions in the reservoir at the point of addition of the fresh sewage liquid, namely the presence of additional organic matter and the substantial absence of oxygen, are ideal for the bacteria in said aerated sewage liquid to satisfy their oxygen requirement by decomposing the nitrate compouhds in the liquid into their elemental components. The oxygen produced is consumed by the bacteria in order to effect the aerobic decomposition of the newly introduced sewage liquid. It should also be noted that more effective denitrification will result by maintaining the water temperature above about 45°F.

The cycle of aerobic decomposition and denitrification proceeds on a continuous basis whereby in each cycle there is some reduction of organic matter, some conversion of ammonia to nitrate in the oxygen-rich area of the reservoir, and some elimination of nitrate in the oxygen-starved area of the reservoir. The average stay of the sewage liquid in the reservoir will be determined by the volume of the reservoir and the flow rate at which fresh sewage liquid enters and leaves the reservoir. Substantial decomposition and denitrification is achieved with a residence time of approximately 24 hours, although longer and shorter periods may be utilized as determined by the practitioner. For example, with a reservoir having a 24 hour flow capacity of sewage, the entry of additional sewage will result in the discharge of treated sewage having an average age of about 24 hours. In this period, the sewage may have completed as many as 50 to 100 cycles of aerobic decomposition and denitrification before being discharged. Furthermore, the volume and rate of sewage liquid discharge will generally correspond to the volume and rate of fresh sewage liquid introduction.

It should be noted that the discharged effluent will generally have at least about 90% of the nitrate concentration produced by said aerobic decomposition of ammonia in the liquid removed by the process of this invention. While there will be additional nitrate formation each time the newly added sewage liquid is subjected to aeration, the fact that the amount of such newly added sewage liquid is small in comparison to the total amount of sewage liquid present in the reservoir will ensure that in most instances, the nitrate content of the effluent does not exceed about 10% of the initial nitrate content produced in the liquid.

As an additional advantage of the process of the invention, it should be noted that the decrease in pH level which usually accompanies denitrification is not present here due to the absence of nitric acid formation. Correspondingly, the formation of soluble calcium phosphate complexes which occurs at acidic pH levels is minimized in this system thereby insuring the presence of greater amounts of phosphate in the sludge rather than in the effluent. Such a phosphate distribution is desired inasmuch as the absence of phosphates substantially diminishes the pollutant effect of the effluent. Accordingly, more phosphates and colloidal solids are now available for removal in a post sterilization technique achieved by adding iron salts, chloride and other flocculents preferably to the secondary sedimentation system, without return of any of the secondary sludge to the reservoir.

A variation in the apparatus of FIG. 2 is depicted in FIG. 3. Thus, the apparatus of FIG. 2 is retained intact with the exception that communication area 22 is fitted with mixing and propulsion means 38. Propulsion means 38 serves to mix the newly introduced sewage with the sewage already in flow in reservoir 10, and to keep the sewage liquid in motion without substantial settling of the sludge therein but does not provide aeration of said sewage liquid. Inasmuch as propulsion means 38 is not an additional source of aeration, the relative distances between inlet means 12 and agitating means 24 are identical to those described in connection with FIG. 2.

It should be noted that propulsion means 38 may be replaced by a second agitating means comparable to agitating means 24, thereby providing an apparatus containing two agitating means 24, 38 and one inlet means 12. Accordingly, the sewage will encounter two areas of aerobic decomposition and one area of denitrification per single revolution in reservoir 10. With the introduction of additional aeration, it is essential that the distance between this second point of aeration 38 and the inlet means 12 be sufficient to allow for substantial decomposition and oxygen depletion of the sewage liquid, while the distance between said inlet means 12 and said agitating means 24 be sufficient to allow for adequate denitrification of the sewage liquid, that is to say, at least 10% of the distance between agitating means 38 and agitating means 24. Furthermore, either or both of these agitating means could be convertible units which function alternately as propulsion-mixers and as aerators, as desired by the practitioner.

A further variation in the apparatus of this invention is depicted in FIG. 4. The apparatus contains reservoir 40, partition 42 defining sections 44, 46 which communicate in areas 48, 50, outlet means 60 and sedimentation system 62 with sludge return line 64 and surplus sludge trench 66. The basic distinction in this apparatus is that it contains two inlet means 52, 54 and two agitating means 56, 58 which are positioned respective to one another so as to exhibit the dimensional relationships discussed hereinabove. Thus, the distance between agitating means 56 and inlet means 54 and the distance between agitating means 58 and inlet means 52, respectively, are sufficient to permit substantial aerobic decomposition of the sewage as well as substantial depletion of the oxygen content thereof. Likewise, the distance between inlet means 54 and agitating means 58 and the distance between inlet means 52 and agitating means 56, respectively, are sufficient to permit substantial denitrification of the sewage liquid prior to further aeration, the latter distances being each at least 10% of the distance between said agitating means 56 and 58.

The process of this invention, as related to the apparatus in FIG. 4, consists of two aerobic decomposition-denitrification cycles per single revolution of sewage liquid. Thus, the sewage may enter at inlet means 54, be set in motion and aerated by agitating means 58, undergo aerobic decomposition and oxygen depletion in the reservoir area between agitating means 58 and inlet means 52, be blended with additional raw sewage introduced at inlet means 52, undergo denitrification in the area between inlet means 52 and agitating means 56, be further aerated at agitating means 56, undergo further aerobic decomposition between agitating means 56 and inlet means 54, be blended with raw sewage introduced at inlet means 54, and undergo further denitrification; this cycle then proceeding on a continuous basis. Discharge of the treated sewage is initiated at the appropriate time in the total process.

Additional variations may, of course, be made in the above-described apparatuses of the invention. For example, a non-partitioned, single run reservoir may be utilized in place of the preferred partitioned reservoir. Likewise, either a multi-sectioned reservoir or a multiplicity of aeration reservoirs connected in series may be utilized in place of the single, dual-section aeration reservoir. The aeration reservoir may be fitted with any number of agitation and propulsion means which may be mounted at various positions in the reservoir as well as with any number of inlet and outlet means, it merely being necessary that the required distances for aerobic decomposition and denitrification be maintained. Furthermore, the inlet means may be so positioned as to inject the untreated sewage liquid in the direction of flow of said aerated sewage liquid. In this manner, greater impetus is given to the movement of the sewage liquid in the reservoir. Baffles may be positioned in the reservoir adjacent to the agitating means and/or in the communicating areas of the partitioned sections in order to increase the aeration of the sewage liquid and aid in moving and directing the flow thereof. In addition, the reservoir may be provided with heaters and/or insulation covers in order to increase the speed of the process as well as to maintain appropriate speed when operating at colder temperatures.

By way of specific illustration of the process of this invention utilizing the apparatus depicted in FIG. 3, sewage liquid was introduced into a 750 foot long reservoir fitted with agitating means and propulsion means and made to move at a minimum speed of 0.8 to 1.0 foot per second. The aerator beat air into the sewage at a rate of about 2–4 lbs. of oxygen per hp. It has been determined that the oxygen furnished by the aerator was substantially consumed in 8–12 minutes by the bacteria in the liquid. At that point of substantial oxygen consumption additional raw sewage liquid was introduced for the denitrification reaction. The sewage liquid was then mixed and continued in motion by means of a mixer-propulsion unit. It is estimated that the average residence of the sewage liquid in the reservoir undergoing continuous aerobic decomposition and denitrification was approximately 24 hours. Analysis of the effluent subsequent to sedimentation and recycle of about 50% of the solid material removed therefrom was estimated to show that in excess of about 90% of the nitrate compound content produced in the sewage liquid will be removed during the process.

In summary, it is to be noted that this invention provides an efficient sewage treatment process and system which can be conducted continuously and which provides maximum decomposition of the organic matter in sewage as well as substantial removal of the potential pollutants which are ordinarily discharged into streams, rivers and the like.

While the invention has been described in terms of the specific embodiments herein, it should be apparent that variation thereof may be developed without departing from the spirit or scope of the invention.

I claim:

1. A continuous activated sludge sewage treatment process comprising, in continuous manner, injecting raw sewage liquid into a reservoir providing a single horizontal closed loop path, circulating the liquid around said path at a speed of at least about 0.8 feet per second and sufficient to avoid substantial settling of sludge suspended therein, aerating the liquid in said path to promote aerobic decomposition of the sewage and formation of nitrate compounds in said liquid, circulating the aerated liquid around said path for a first distance in which said decomposition proceeds until the liquid is substantially devoid of oxygen at the point of raw sewage injection, circulating the liquid containing nitrate compounds and raw sewage around said path for a second distance in which denitrification proceeds in said liquid until it reaches the next point of aeration in said path, continuously removing treated liquid, for clarification and settling of sludge therein, at a rate approximating the rate of injection of the raw sewage liquid, discharging the resulting clarified liquid effluent and returning at least a portion of the settled sludge to the liquid in said reservoir, the average retention time of the liquid in the reservoir being at least about 24 hours, said second distance being at least about 10% of the sum of said first and second distances.

2. The process of claim 1 wherein the raw sewage liquid is injected into the reservoir in the direction of flow of the liquid therein.

* * * * *